United States Patent [19]

Galvin

[11] Patent Number: 5,136,229
[45] Date of Patent: Aug. 4, 1992

[54] POWER PACK DEVICE

[76] Inventor: Jay M. Galvin, 5200 S. Lakeshore, #135, Tempe, Ariz. 85283

[21] Appl. No.: 729,703

[22] Filed: Jul. 15, 1991

[51] Int. Cl.$^5$ .................................................. H02J 7/00
[52] U.S. Cl. ......................................... 320/2; 319/61; 455/89; 455/127
[58] Field of Search ................. 320/2, 22; 307/149, 307/150; 379/61, 63; 455/89, 90, 127, 343, 349

[56] References Cited

U.S. PATENT DOCUMENTS

| | | | |
|---|---|---|---|
| 3,652,915 | 3/1972 | Eberts | 320/39 X |
| 3,757,194 | 9/1973 | Weber | 320/2 |
| 3,919,491 | 11/1975 | Luce | 379/61 |
| 4,272,650 | 6/1981 | Bolgiano et al. | 307/66 X |
| 4,511,761 | 4/1985 | Yamazaki et al. | 455/89 X |
| 4,634,810 | 1/1987 | Grassl | 379/61 |
| 4,709,201 | 11/1987 | Schaefer et al. | 320/2 |
| 4,726,052 | 2/1988 | Kato et al. | 379/61 |
| 4,752,949 | 1/1988 | Steinbeck et al. | 379/61 |
| 4,829,226 | 5/1989 | Nakamura et al. | 320/2 X |
| 4,939,770 | 7/1990 | Makino | 379/61 |
| 4,998,055 | 3/1991 | Nash et al. | 320/2 |
| 5,001,772 | 3/1991 | Holcomb et al. | 320/2 X |
| 5,046,131 | 9/1991 | Takahashi et al. | 455/127 X |

Primary Examiner—Steven L. Stephan
Assistant Examiner—Kristine Peckman
Attorney, Agent, or Firm—LaValle D. Ptak

[57] ABSTRACT

A power pack unit is provided for utilization with battery-operated devices employing rechargeable batteries. The power pack unit specifically is designed for utilization with hand-held, portable cellular telephones having a removable, rechargeable battery pack. The power pack unit is physically configured to connect to the cellular telephone and provide electrical interconnections in place of the battery pack, which then is placed on the power pack unit on the opposite side, such that the power pack unit is "sandwiched" between the cellular telephone and the rechargeable battery. A supplemental power source may be connected to the power pack unit. When power is supplied from a supplemental source, the power pack unit supplies operating power to the cellular telephone and, simultaneously, supplies charging current to the battery. A cross-over switching circuit within the power unit isolates or disconnects the battery from the cellular telephone whenever external power is supplied to the power pack unit. The switch-over circuit connects the battery through the power pack unit to the cellular telephone to operate the telephone whenever no supplemental power is supplied to the power pack unit. The cellular telephone, consequently, may be operated at all times, including the times when the battery pack is being recharged.

14 Claims, 2 Drawing Sheets

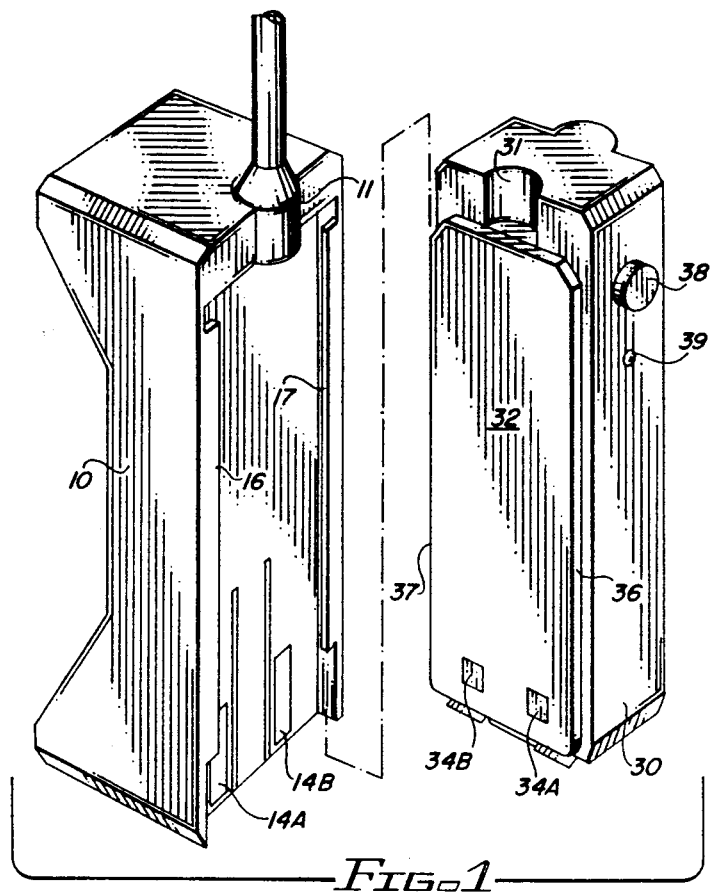
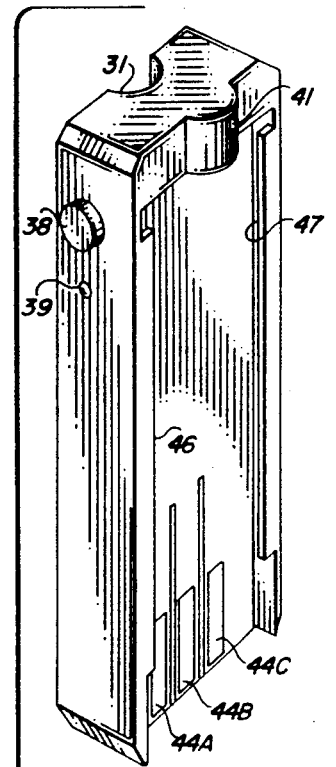
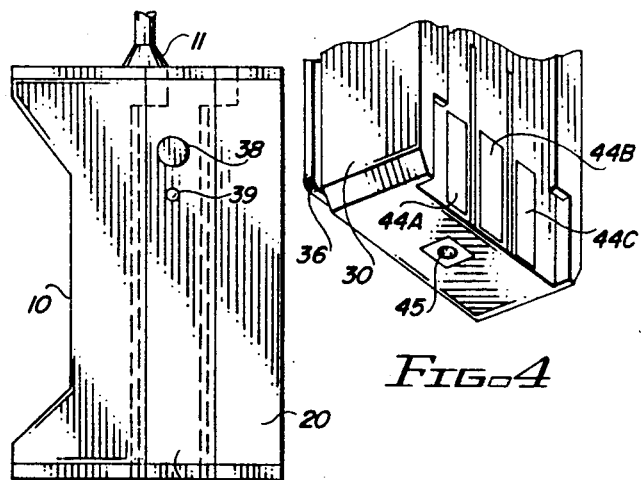
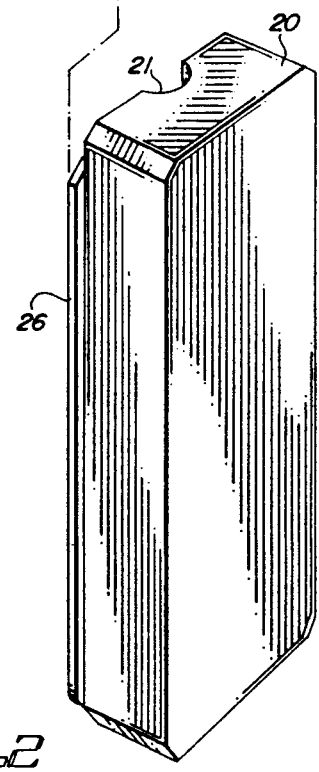

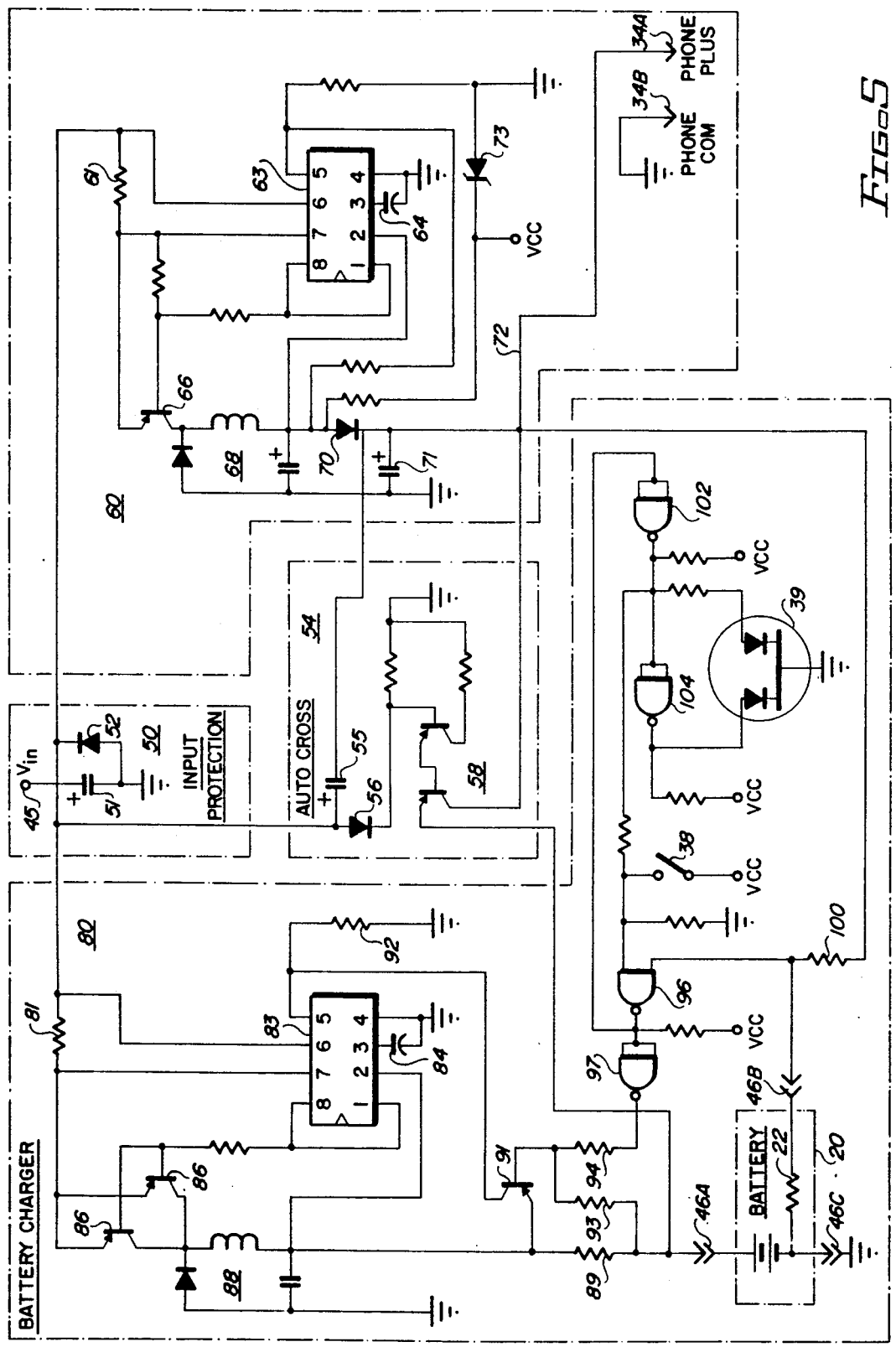

POWER PACK DEVICE

BACKGROUND OF THE INVENTION

A variety of different battery-operated tools and other consumer products currently are available on the market. Typically, these products are powered by rechargeable batteries or rechargeable battery packs. Devices of this type include portable battery-powered electric drills and screwdrivers, VCR cameras, cellular telephones, and the like. Some such devices, such as portable hand tools, generally build the rechargeable battery into the tool. When the tool is not in use, it is placed on a charging stand connected to a source of charging current, to recharge the battery between uses. Operation of the tool always is from the battery, and operation of the tool is not intended when the battery is being charged.

VCR cameras and cellular telephones typically employ removable batteries or battery packs. Such cameras and cellular telephones are operated from the batteries, and the batteries generally are removed from the devices and placed in a charger (either a "trickle" charger or a fast charger) to recharge the batteries between uses. Users of such devices generally have two or more batteries, one of which is in the charger and the other of which is in the device. Consequently, when a battery becomes discharged, it is removed from the camera or telephone and replaced with the battery which was being charged. The depleted battery then is placed on the charger, and this cycle is repeated. Obviously, this requires a number of separate items, including the extra batteries or battery packs, since a single battery pack is not sufficient if continuous use or long-term use of the camera or cellular telephone is desired.

Some cellular telephones also include a power convertor that can be used in place of the battery pack to operate the telephone. Typical of such power convertors are a battery eliminator pack, which plugs into the lighter socket or some other source of supplemental power within an automobile, and is attached to the cellular telephone in place of the battery pack. Thus, the battery pack then may be placed in a battery charger, to charge it up and maintain the charge until it next is needed. Currently available battery eliminator devices of the type which plug into the electrical output of an automobile are removed from the cellular telephone and replaced with a battery pack whenever the cellular telephone is to be used in locations other than the automobile. Cellular telephones, in addition, currently are designed such that the battery cannot be fast charged while it is attached to the telephone.

Cordless telephones, primarily designed for household use, include a base station and a portable handset. When the handset is not in use, it typically is placed on the base station; and contacts are provided to charge the rechargeable battery mounted within the handset; so that it is ready for operation as desired. Several patents directed to cordless telephones employing this basic feature are Luce U.S. Pat. No. 3,919,491; Yamazaki et al U.S. Pat. No. 4,511,761; Grassl U.S. Pat. No. 4,634,810; Kato U.S. Pat. No. 4,726,052; and Makino U.S. Pat. No. 4,939,770.

The patent to Steinbeck U.S. Pat. No. 4,752,949 is directed to a telephone which is capable of operation in either a cordless or corded mode. The portable handset used in both of these modes includes a battery which is only charged when the handset is placed in an "on hook" condition. This is a standard mode of operation for household cordless telephones. The unit, however, also includes an automatic switch-over from cordless to corded operation whenever the cord is plugged into the handset portion. No charging of the battery takes place in this mode, which is similar in some respects to cellular telephones which can be operated either from a battery or from a supplemental power source.

The Bolgiano U.S. Pat. No. 4,272,650 is directed to a portable telephone system. The configuration for the telephone includes a power supply network having a primary high voltage power source (an external battery) which normally operates the telephone. When this external battery power source is connected, the operation of the telephone is effected in its normal manner. In addition, however, a secondary, low voltage battery is continuously charged by the primary higher voltage power source battery. When the primary power source is removed for replacement or recharging, the secondary, low voltage battery provides power to a portion only of the circuitry of the telephone. The telephone unit itself, however, cannot be operated by the secondary power source alone.

It is desirable to provide a power pack unit for operation with battery-operated devices, such as cellular telephones, which simultaneously powers the telephone, or other devices, and supplies charging current to the battery when supplemental power is connected, while automatically causing the telephone to be operated from the battery, when supplemental power no longer is connected.

SUMMARY OF THE INVENTION

It is an object of this invention to provide an improved power pack unit for electrical devices.

It is another object of this invention to provide an improved power pack unit for battery-operated portable devices which permits simultaneous charging of a battery and operation of the device.

It is another object of this invention to provide an improved modular power pack unit for battery-operated cellular telephones.

It is a further object of this invention to provide an improved power pack unit for selectively operating a battery-operated device, either from a battery or from a supplemental power source, with automatic switch-over circuits to accomplish the selection.

In accordance with a preferred embodiment of the invention, a power pack unit is employed for operation with battery-operated devices using rechargeable batteries. The power pack unit may be simultaneously connected with both the battery-operated device and a rechargeable battery for the device. Supplemental power is selectively supplied to the power pack unit to provide operating power to the device, and, simultaneously, to provide charging current to the rechargeable battery. An automatic switching circuit is employed in the power pack unit for isolating or disconnecting the battery from the battery-operated device whenever supplemental power is supplied to the power pack unit, and for interconnecting the rechargeable battery with the device whenever no supplemental power is supplied to the power pack unit.

BRIEF DESCRIPTION OF THE DRAWINGS

FIGS. 1 and 2 comprise exploded perspective views of the physical construction of a preferred embodiment of the invention;

FIG. 3 is a side assembled view of the embodiment shown in FIGS. 1 and 2;

FIG. 4 illustrates details of a portion of the embodiment shown in FIGS. 1 and 2; and FIG. 5 is a schematic circuit diagram of the operating system of the embodiment shown in FIGS. 1 through 4.

DETAILED DESCRIPTION

Reference now should be made to the drawings in which the same reference numbers are used throughout the different figures to designate the same components. FIGS. 1 and 2, together, constitute a perspective view of a preferred embodiment of the invention used in conjunction with a cellular telephone.

As illustrated in FIG. 1, a conventional hand-held portable cellular telephone 10 is illustrated in conjunction with the preferred embodiment of the invention. The telephone 10 is shown with the overall configuration of the popular Motorola® hand-held portable series of cellular telephones. This telephone 10 has an antenna 11 extending from its top, and a recessed back with a pair of inwardly-turned battery-holding guide flanges 16 and 17, located on opposite sides of the telephone 10. Electrical contact plates or terminals 14A and 14B are located near the bottom of the telephone near its rear. The original design of the telephone 10 is made to accommodate a battery pack 20 (FIG. 2) which has a recess 21 near the top for accommodating the exposed portion of the cylindrical base of the antenna 11. The battery pack 20 also has a pair of extending flanges 26 (shown) and 27 (not shown) spaced outwardly from the side of the battery pack 20 which faces the rear of the telephone 10, for engaging the flanges 16 and 17, to hold the battery pack 20 in place on the rear of the telephone 10. Mating electrical contact plates or terminals (not shown), located near the bottom of the battery pack 20, make electrical contact with the contact plates 14A and 14B to provide operating power to the cellular telephone 10. The telephone 10 and the battery pack 20 are of conventional, commercially available configurations.

As mentioned previously, once the charge in the battery 20 is depleted, it is necessary to replace the battery pack 20 with a new battery pack, and then to recharge the depleted battery pack 20 on a suitable charger. Alternatively, the telephone 10 must be taken out of service and placed on a battery charger. As mentioned previously, a battery eliminator also currently is available for operation from a lighter socket in an automobile, and attaches to the back of the telephone 10 in place of the battery pack 20, to provide operating power to the contacts 14A and 14B.

The invention includes an electrical battery-charging/power-providing power pack 30 having an external configuration which is comparable to the configuration of the standard battery pack 20. The power pack 30 includes a back 32, which has a pair of side edges 36 and 37 spaced outwardly from the main body portion of the pack 30 for engagement with the flanges 16 and 17, to mount the power pack to the back of the cellular telephone 10 in the position normally occupied by a battery pack 20. A semi-cylindrical recess 31 is provided near the top of the power pack 30 to fit around and abut against the bottom of the antenna 11 to provide a stop or locating position for the power pack 30, in the same manner that a battery pack 20 is located on the rear of the telephone 10. A pair of mating electrical contacts 34A and 34B are provided for engagement with the power input contacts 14A and 14B on the back of the telephone to establish electrical interconnection between the power pack 30 and the telephone 10.

A push button 38 is located on the side of the power pack for activating a "fast" charge circuit within the power pack when a fast charge operation is desired. A two-color light-emitting diode (LED) 39, capable of emitting two different colors (green and red, for example), is provided on the side of the power pack 30 to indicate the state of operation of the power pack 30. When the LED 39 is turned on, the operator of the telephone 10 is aware that the power for operating the telephone is being provided through the power pack 30 by a supplemental power source connected to receptacle 45. The color of the diode 39 which is turned on is indicative of the state of the charging current provided by the power pack 30 to a battery pack 20, also attached to the power pack 30.

If the power pack 30 is connected to the telephone 10 without a battery pack 20 also connected to the opposite side of the power pack, the power pack 30 operates much in the same manner as a presently available battery eliminator for a cellular telephone 10. The power pack 30, however, also has another feature inasmuch as it is employed as a "sandwich" between the cellular telephone 10 and a rechargeable battery pack 20 in the manner illustrated in FIG. 3. To do this, the rear of the power pack 30, as illustrated in FIGS. 2 and 4, is configured to physically resemble the rear of the cellular telephone 10. To accomplish this, a dummy semi-cylindrical projection 41, which corresponds to the physical dimensions of the base of the antenna 11, is provided at the top of the power pack. A pair of inwardly-turned battery-engaging flanges 46 and 47, comparable to the flanges 16 and 17 on the telephone 10, are provided to engage the flange-engaging lips 26 and 27 on the battery pack 20. At the bottom of the battery-facing side of the power pack 30, are three contacts 44A, 44B and 44C, which correspond to similar contacts on the battery pack 20 for providing charging current to the battery, and for receiving cellular telephone operating current from the battery, depending on the mode of operation of the power pack 30.

FIG. 4 is a perspective view of the bottom of the power pack 30, illustrating a bayonet connector receptacle 45 for receiving power from a supplemental power source, such as a lead attached to a plug for engagement with an automobile cigarette lighter socket, or for connection to an alternating current to direct current transformer and converter for supplying operating power to the power pack 30.

In normal operation, the power pack 30 is physically attached to the rear of the cellular telephone 10 in the same manner for connecting a battery to a telephone 10. A battery pack 20 then is connected to the other side of the power pack 30, as illustrated in FIG. 3, and all three of these units remain in place as shown in FIG. 3. The power pack 30 is approximately one-half inch thick, and has the same width and height as a conventional battery pack 20 used for such a telephone. Consequently, the overall physical dimensions of the cellular telephone 10, with a battery pack 20 attached to it, are increased only slightly by the inclusion of the power pack unit 30. The weight of the power pack unit 30 is only a fraction of that of a standard rechargeable battery pack 20; so that the overall handling of the cellular telephone 10 is not changed much from that of the telephone 10 with only a battery pack 20.

In summary, the unit which is shown in FIGS. 1 through 4 permits the phone to be operated and the battery 20 to be charged simultaneously. If desired, the battery 20 can be independently disconnected from the power pack 30, or the power pack 30 and battery 20 may be disconnected to charge the battery pack 20 apart from the cellular telephone 10. If this is done, however, a separate battery pack 20 or eliminator needs to be attached to the cellular telephone 10 to allow it to be operated when the power pack unit 30 is removed. This flexibility of use of the power pack 30, however, permits the power pack unit 30 to operate as an independent battery pack charger if the owner of the cellular telephone 10 has two or more batteries, and desires to charge one of these batteries while the cellular telephone 10 is otherwise used.

Reference now should be made to FIG. 5, which is a detailed schematic circuit diagram of the circuit located within the power pack 30. As illustrated in FIG. 5, the supplemental power applied through the connector 45 is applied to an input protection circuit 50. This circuit has a filter capacitor 51 in it, and a shorting diode 52 to prevent damage to the circuit components of the system in the event input power of the wrong polarity is connected to the terminal 45. Typically, the power supply to the terminal 45 is 14 Volts direct current obtained from an automobile power supply, such as through a plug inserted into the automobile cigarette lighter socket, or from a 14 VOC wall power convertor.

Essentially, the circuit of FIG. 5 is divided substantially down the center. The portion on the left hand side constitutes the battery charger circuitry 80 for providing charging current to a battery pack 20 interconnected to the connectors 46A, 46B and 46C, corresponding to the same numbered connectors in FIGS. 2 and 4. The portion on the right hand side constitutes the phone power convertor 60 for providing operating potential through the contacts 34 to the cellular telephone 10. The central portion of the circuit comprises an automatic cross-over switch 54 for insuring that power for the cellular telephone 10, as applied to the terminals 34, is obtained from the input 45 whenever power is available on the terminal 45, and for switching over the power source for the terminals 34 to the battery 20, whenever no power is applied to the input terminal 45.

Assume, initially, that supplemental power is supplied to the terminal 45. This causes a positive potential to be applied through a diode 56 to the base of the input transistor of a pair of cascaded switch PNP transistors 58 to cause these transistors to be rendered non-conductive. A capacitor 55 is provided in the cross-over network 54 to filter out any negative spikes from the power supplied to the telephone 10. When the transistors of the switch 58 are non-conductive, current flow from the battery 20 to a lead 72, in the phone section 60 of the circuit, is prevented. Consequently, phone power section 60 provides operating power for telephone terminals 34.

The phone power section 60 is a buck type, DC-to-DC, switchmode converter operated as a constant voltage source in a manner well known to the art. A timing capacitor 64 established the open loop switching frequency generated internally to a standard DC-to-DC converter controller circuit 63 (which may be a Motorola ® MC34063AP1). In the event the telephone terminals 34 are shorted while supplemental power is applied to the receptacle 45, shunt resistor 61 provides shorted circuit protection of the phone power section 60 in a manner well known to the design of the circuit 63. In operation, a Darlington output switch internal to the circuit 63 is driven by the product of the oscillator circuit internal to the circuit 63 and the sum of a feedback voltage applied to pin 5 of the circuit 63 and a reference voltage internal to the circuit 63. The resultant square wave output signal, which appears at pins 1 and 8 of the circuit 63, is of an appropriate duty cycle to drive the base of the switching transistor 61 to insure the desired voltage regulation. The resultant pulsed output of the transistor 61 is filtered by a filter 68 to provide a relatively smooth, constant voltage output at the anode of a diode 70. A small portion of this output is returned to pin 5 of the circuit 63 through appropriate voltage divider resistors to provide the voltage feedback necessary to effect voltage regulation as described in the preceding.

The constant voltage output of the section 60 is fed through the isolating diode 70 to the lead 72 which is connected to the telephone terminal 34. Thus, the circuit 60 applies operating potential to other parts of the circuit of FIG. 5 through a voltage divider connected between the filter 68 and ground. The voltage of the operating potential VCC is established by a Zener diode 73 in this voltage divider in a conventional manner.

An important feature of the preferred embodiment of this invention is the simultaneous provision of a charging current to the battery pack 20, through leads 46, and operating potential to the phone 10 through the phone connector leads 34A and 34B whenever operating potential is applied to the input terminal 45 of the power pack 30. Consequently, while the phone 10 is being operated in the manner described immediately above, charging potential also is developed for providing either a fast charge or a slow charge to the battery pack 20 physically attached to the rear of the power pack 30, in the manner described above in conjunction with FIGS. 1 through 4. This is accomplished by supplying the input potential to a battery charger circuit 80 which produces a charging current to the battery 20 much in the same manner that the operating current for the phone is provided by the phone section 60. Signals are supplied from the input terminal 45 to a DC-to-DC converter controller which is similar to the circuit 63. The circuit 83 has a frequency of operation established by a timing capacitor 84 in the same manner as described previously in conjunction with the operation of the circuit 63. The output of the circuit 83 is applied to the base of a pair of parallel connected PNP transistor switches 86 which have their collectors connected together in common to supply square-wave signals to a filter circuit 88. The filter 88 operates to smooth the signal supplying a charging current through a shunt resistor 89 to the battery pack 20 for charging the battery.

Constant current control of the battery charger 80 is provided by the actions of a transistor 91. During slow or trickle charge of the battery pack 20, the output of a NAND gate 97 is held low to cause bias resistors 93 and 94 to hold the transistor 91 partially conductive. Consequently, a small voltage drop across the resistor 89, resulting from the slow charge current, is sufficient to increase the conduction of the transistor 91, thereby allowing a larger feedback voltage to appear at pin 5 of the circuit 83. The resulting voltage regulation action, as explained in the operation of the phone power section 60, thereby insures the output of the filter 88 is maintained at a level appropriate to cause the desired slow charge current. In this mode, the LED diode 39 is provided with operating current from VCC, as illustrated in the lower central portion of FIG. 5, and it produces a green colored light.

Assume now that the system is to be operated to provide a high or fast charge for the battery 20. The momentary push-button switch 38 is closed to apply VCC operating potential to the upper one of the two inputs to the NAND gate 96. Normally, this input has a low potential applied to it, while the lower input to the NAND gate 96 is provided with a relatively high operating potential through a resistor 100 connected to the lead 72 in the phone section of the unit. As a result, so long as the momentary push button switch 38 remains open, the output of the NAND gate 96 remains high. When the switch 38, however, is momentarily closed, both inputs to the NAND gate 96 are high, thereby driving its output low. This, in turn, causes the output of the NAND gate 97 to go high, leaving the voltage divider transistor 91 without fixed bias. The voltage regulation action of the circuit 83 then causes the output of the filter 88 to increase, thereby increasing the current through the resistor 89 until the resulting voltage drop across the resistor 89 is sufficient to bias the transistor 91 into conduction. The resulting feedback to pin 5 of the circuit 83 causes the output of the filter 88 to remain at a level appropriate to cause the high charging current rate.

In the fast charge control circuit, the effect of the momentary operation of the switch 38 also is to feed a momentary low signal to the two inputs of the NAND gate 102 causing its output to go high, thereby providing operating potential to LED diode 39 to produce a red output light.

To prevent damage to the battery in the battery pack 20 by over-charging during the fast charge operation as just described, a thermistor 22, internal to the battery pack 20, is connected in the voltage divider consisting of the resistor 100 and the resistor 22 connected across the telephone output terminals 34A and 34B. The thermistor 22 is comparable in resistance at room temperature to the value of the resistor 100. However, when the battery becomes hot from fast charging, the thermistor 22 senses the temperature of the battery; and the resistance drops. The resultant change in the potential applied to the lower input of the NAND gate 96 causes the lower input to drop to a low potential, forcing the output of the NAND gate 96 to go high. When this occurs, operating potential once again is applied to the base of the PNP voltage divider transistor 91 to change the operating status of the system back to the low current or slow charge operation initially described. At the same time, the change in the potential at the output of the NAND gate 96 is applied to the inputs of the NAND gate 102 to switch the LED indicator light 39 to green. It is readily apparent that the system operates to provide either a slow charge or a fast charge to a battery pack 20 attached to it while simultaneously supplying the desired operating power to the cellular telephone 10 to which the power pack 30 is connected.

If, now, input power is removed from the input terminal 45, no more charging current is supplied to the battery pack 20. At the same time, no operating potential is supplied through the phone section 60 of the system to the terminal 34A for the cellular telephone 10. Operating potential, however, is applied from the battery 20 through the now conductive transistor switch 58, since the blocking potential has been removed from the base of the cascaded transistor switch 58. The transistors of the switch 58 are forward biased by ground potential applied to the base of the lower transistor of the switch. As a result, there is an automatic cross-over or switch to operation from the battery 20 at any time the input potential applied to the terminal 45 is removed. Similarly, whenever operating potential is applied to the terminal 45, the transistors 58 in the cross-over switch section 54 automatically block application of power to the phone 34A from the battery 20, and supply operating power to the phone 10 through the phone section 60 in the manner described previously.

The foregoing description of the preferred embodiment of the invention should be considered as illustrative and not as limiting. Various changes and modifications will occur to those skilled in the art without departing from the true scope of the invention as defined in the appended claims.

I claim:

1. A power pack unit for operation with a battery-operated device using a rechargeable battery including in combination:
    means for simultaneously interconnecting said power pack unit with a battery-operated device and with a rechargeable battery for said battery-operated device;
    power supply means for selectively receiving supplemental power;
    battery-charging circuit means interconnected with said power supply means for charging said rechargeable battery when supplemental power is received by said power supply means;
    switch means automatically operated for connecting said battery to said battery-operated device for operating said battery-operated device when no supplemental power is supplied to said power pack unit, and for disconnecting said battery from said battery-operated device when supplemental power is received by said power supply means; and
    means for supplying operating power to said battery-operated device from said power pack unit when said power supply means receives supplemental power.

2. The combination according to claim 1 wherein said power pack unit is interconnected with both said battery-operated device and said rechargeable battery during use of said device.

3. The combination according to claim 2 wherein said battery-charging circuit means simultaneously supplies charging current to said rechargeable battery and operating power to said battery-operated device whenever said power supply means receives supplemental power.

4. The combination according to claim 3 further including means in said battery-charging circuit means for selectively charging said rechargeable battery at different rates of charge.

5. The combination according to claim 4 further including means in said battery-charging circuit means for automatically switching the charging current supplied to said battery from a fast charge rate to a slow charge rate in response to a predetermined charge condition of said battery.

6. The combination according to claim 1 wherein said battery-charging circuit means simultaneously supplies charging current to said rechargeable battery and operating power to said battery-operated device whenever said power supply means receives supplemental power.

7. The combination according to claim 1 further including means in said battery-charging circuit means for selectively charging said rechargeable battery at different rates of charge.

8. The combination according to claim 7 further including means in said battery-charging circuit means for automatically switching the charging current supplied to said battery from a fast charge rate to a slow charge rate in response to a predetermined charge condition of said battery.

9. A power pack unit for operation with a battery-operated cellular telephone using a removable rechargeable battery pack said power pack unit including in combination;

a housing having physical and electrical interconnections for mating with corresponding physical and electrical connections on a cellular telephone in the place of a rechargeable battery pack when the rechargeable battery pack is removed;

means on said housing having physical and electrical interconnections corresponding to the physical and electrical connections of said cellular telephone, for permitting mounting of said rechargeable battery pack on said housing;

power supply means for selectively receiving supplemental power;

circuit means for supplying operating power to said cellular telephone from said power supply means whenever said power supply means receives supplemental power;

battery-charging circuit means responsive to power supplied by said power supply means for charging said rechargeable battery pack physically interconnected with said power pack unit when supplemental power is received by said power supply means; and cross-over switching means for interconnecting said rechargeable battery to said cellular telephone to operate said cellular telephone when no supplemental power is received by said power supply means, and for disconnecting said rechargeable battery from said cellular telephone when supplemental power is received by said power supply means, such that whenever said power supply means receives supplemental power, said cellular telephone is operated by said supplemental power and, simultaneously, said rechargeable battery is supplied with charging current from said power pack unit, with said switch means isolating said rechargeable battery from said cellular telephone so long as operating power is supplied to said cellular telephone from said power pack unit.

10. The combination according to claim 9 wherein said switch means is operated automatically.

11. The combination according to claim 10 further including means in said battery-charging circuit means for selectively charging said rechargeable battery at different rates of charge.

12. The combination according to claim 11 further including means in said battery-charging circuit means for automatically switching the charging current supplied to said battery from a fast charge rate to a slow charge rate in response to a predetermined charge condition of said battery.

13. The combination according to claim 9 further including means in said battery-charging circuit means for selectively charging said rechargeable battery at different rates of charge.

14. The combination according to claim 9 wherein said power pack unit is interconnected with both said battery-operated device and said rechargeable battery during use of said device.

* * * * *